United States Patent [19]

Cadet et al.

[11] 4,392,174

[45] Jul. 5, 1983

[54] ELECTRIC PROTECTION DEVICE

[75] Inventors: Christian Cadet, Taverny; Bernard Dumortier, Montreuil sous Bois; Georges Souques, Paris, all of France

[73] Assignee: La Telemecanique Electrique, France

[21] Appl. No.: 387,400

[22] Filed: Jun. 11, 1982

Related U.S. Application Data

[63] Continuation of Ser. No. 137,923, Apr. 7, 1980, abandoned.

[30] Foreign Application Priority Data

Apr. 6, 1979 [FR] France .............................. 79 08732

[51] Int. Cl.[3] .......................................... H02H 3/347
[52] U.S. Cl. ...................................... 361/45; 361/44; 361/113
[58] Field of Search ...................... 361/45, 44, 46, 47, 361/42, 113, 48, 49; 340/650, 651

[56] References Cited

U.S. PATENT DOCUMENTS

| | | | |
|---|---|---|---|
| 3,772,569 | 11/1973 | Wible | 361/45 |
| 3,801,871 | 4/1974 | Loh | 361/45 |
| 3,936,699 | 2/1976 | Adams | 361/45 |
| 3,953,766 | 4/1976 | Howell et al. | 361/45 |
| 3,973,171 | 8/1976 | Howell | 361/45 |

Primary Examiner—Patrick R. Salce
Attorney, Agent, or Firm—William A. Drucker

[57] ABSTRACT

A protection device has first and second differential transformers each with a toroidal magnetic core through which pass the neutral and phase conductors of an alternating current distribution network, and a secondary winding. The secondary winding of the first transformer is coupled to the input of an amplifier followed by a rectifier, a threshold comparator and a control device adapted to release a circuit-breaker. The secondary winding of the second transformer is coupled to the output of the amplifier. The improvement is constituted by an auxiliary amplifier inserted between the output of the first amplifier and the terminals of the secondary winding of the second differential transformer.

9 Claims, 1 Drawing Figure

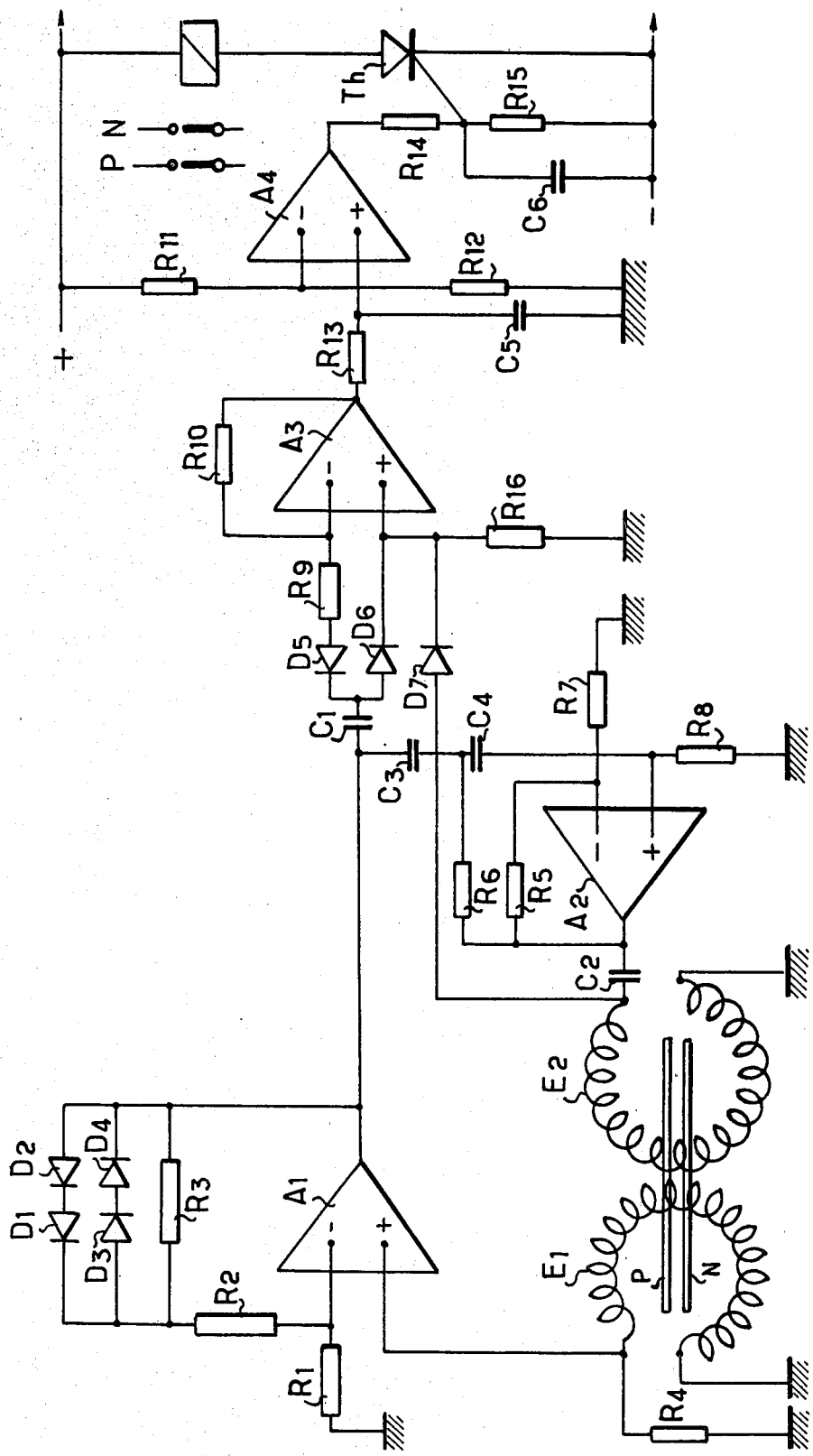

ELECTRIC PROTECTION DEVICE

This is a continuation of Ser. No. 137,923, filed Apr. 7, 1980; now abandoned.

BACKGROUND OF THE INVENTION

The invention relates to protection devices of the type comprising first and second differential transformers each having a toroidal magnetic core through which pass the phase conductors, and also perhaps, the neutral, of an alternating current distribution circuit, and a secondary winding, the secondary winding of the first transformer being coupled to the input of an amplifier followed by a rectifier, a threshold comparator and a control means suitable to actuate a circuit-breaker, whilst the secondary winding of the second transformer is coupled to the output of the said amplifier.

When, as a result of a direct contact with one of the phase conductors, a fault current circulates between this conductor and earth, the first transformer generates a voltage which, after amplification and rectification, is compared with a reference threshold in order to give a control signal which releases the circuit breaker after a certain delay. Further, as the neutral conductor is normally coupled to earth upstream of the protection device, if an insulation defect is produced accidentally downstream, the current which can then circulate in the feedback loop constituted by the neutral conductor and earth modifies the mutual inductance between the two secondary windings, so that the circuit constituted by these two windings and the amplifier can enter into oscillation. This oscillation at a relatively high frequency is rectified and compared with the reference threshold and will likewise release the circuit breaker. It is useful to observe that this protection is indispensable, when the neutral is distributed, so that the protection of persons shall not be prevented in the case of accidental earthing of the neutral conductor downstream of the device.

The protection devices of the type set forth above can in particular be mounted in current outlets intended to be installed in bathrooms or other locations where a protection is particularly necessary.

THE PRIOR ART

The protection devices of the prior art have inconveniences which result from the fact that the feedback loop is purely passive. As a result, the resistance of the earth fault must be very small (at the maximum of the order of 1 Ohm) in order that the oscillation shall be able to be produced, and that consequently the protection shall be effective. Furthermore, if one modifies the threshold for protection of persons, which is obtained by modifying the adjustment of the gain of the amplifier, there is modified at the same time the maximal value of the resistance that the earth fault must have in order that the protection shall be effective.

OBJECT OF THE INVENTION

The object of the invention is to assure protection even in the case where the resistance of the earth fault is relatively high (attaining for example one or several tens of ohms) and to make the said maximal value independent of the said protection threshold.

SUMMARY OF THE INVENTION

In accordance with the invention, these results are obtained by inserting an auxiliary amplifier between the output of the first amplifier and the terminals of the secondary winding of the second differential transformer.

In accordance with a preferred manner of construction, the circuit of the said auxiliary amplifier is arranged to be insensitive to the frequency of the distribution network.

Other features, as well as the advantages of the invention, will appear clearly from the following description.

BRIEF DESCRIPTION OF THE DRAWING

The single FIGURE of the drawing shows a protection device conforming to a preferred manner of carrying out the invention.

DESCRIPTION OF THE PREFERRED EMBODIMENT

There are shown, $E_1, E_2$ the secondary windings of two differential transformers of which the toroidal core, not shown, is traversed by the conductors of the distribution system, of which a conductor of phase P and the neutral N have been shown. One extremity of the winding $E_1$ is coupled to the earth connection and the other extremity to the positive input of an operational amplifier $A_1$ and to earth through a resistance $R_4$. The negative input of $A_1$ is coupled to earth by means of a resistance $R_1$ and at the output of $A_1$ by a network permitting to obtain a variable gain constituted by two resistances $R_2$ and $R_3$ in series and by two pairs of diodes $D_3D_4$ and $D_1D_2$ mounted in parallel to the terminals of $R_3$ and in reverse sense, one to the other.

The output of $A_1$ is coupled, by a condenser $C_1$, to a rectifier circuit composed of an operational amplifier $A_3$, a first diode $D_5$ mounted in reverse direction in series with a resistance $R_9$ coupled to the negative input of $A_3$, a second diode $D_6$ mounted in the obverse direction and coupled to the positive input of $A_3$, and a resistance $R_{10}$ coupling the negative input of $A_3$ to its output. The positive output of $A_3$ is coupled to earth across a resistance $R_{16}$.

The output of $A_3$ is coupled to the positive input of an operational amplifier $A_4$ serving as a voltage comparator, by means of a time constant circuit composed of a resistance $R_{13}$ and a condenser $C_5$.

The negative input $A_4$ receives a reference voltage provided by a resistance bridge $R_{11}, R_{12}$, $R_{11}$ being coupled to a positive voltage source and $R_{12}$ to earth. The output of $A_4$ polarises the striker of a thyristor Th by means of a resistance bridge $R_{14}, R_{15}$. The resistance $R_{14}$ is coupled to the output of $A_4$, while $R_{15}$ is coupled to the negative terminal of the voltage source and shunted by a condenser $C_6$.

The output $A_1$ excites the positive input of an operational amplifier $A_2$ by means of a bridge comprising two condensers $C_3$ and $C_4$ in series with a resistance $R_8$. The point common to $C_3$ and $C_4$ is coupled to the output of $A_2$ which is itself coupled to one end of the winding $E_2$ through a condenser $C_2$. The other end of $E_2$ is coupled to earth. The negative input of $A_2$ is coupled to earth by a resistance $R_7$ and to the output of $A_2$ by means of a resistance $R_5$. The point common to $C_2$ and $E_2$ is coupled to the positive terminal of $A_3$ by a diode $D_7$ mounted in the obverse sense.

The operation of the device which has been described is as follows:

In case of direct contact between a person and one of the wires P downstream of the device, a voltage is generated at the terminals of $E_1$, amplified by $A_1$, and rectifier by the rectifier circuit which includes the amplifier $A_3$. When the charge voltage of the condenser $C_5$ across the resistance $R_{13}$ is greater than the threshold of the comparator which includes the amplifier $A_4$, this latter provides a signal which triggers the thyristor. This latter, in known manner, controls a circuit-breaker, not shown.

In case of accidental defect to earth of the neutral conductor N downstream of the device, the loop constituted by $E_1, A_1, A_2$ and $E_2$ enters into oscillation at a relatively high frequency (4 KHz for example). The resultant voltage, as precedingly, is rectified and compared to the reference constituted by the threshold of the comparator, in order finally to throw out the circuit breaker.

An important feature of the circuit described and shown lies in the presence of $A_2$ in the loop. The gain of $A_2$ depends upon the resistances $R_5$ and $R_7$ and it is therefore sufficient if these be variable in order to permit their adjustment to obtain a setting up of oscillation even when the current in the earth return is very small, as a result of the fact that the resistance of the leak to earth is relatively high (one to several tens of Ohms for example).

According to another feature of the circuit, the components $C_3, C_4$, $R_8$ and $R_6$ are selected in such a manner as to transmit only relatively high frequencies, with the exclusion of 50 Hz which, if it was amplified by $A_2$ and reinjected into the rectifier circuit, would cause an untimely throw-out.

A further feature of the circuit is found in the fact that the gain of the amplifier $A_1$ decreases when its input voltage increases. This decrease is due to the fact that the progressive unlocking of the diodes $D_1, D_2$ and $D_3, D_4$ has as its effect the progressive suppression of the influence of $R_3$, and thus to reduce the gain. It can thus be arranged that $A_1$ does not achieve saturation in the limits of fault currents due to a direct contact going from 5 mA to 1 A for a 220 V network, for example.

Another feature of the circuit is the presence of a time constant circuit $R_{13}C_5$ thanks to which the delay which occurs between the appearance of the fault and the throw-out becomes shorter as the fault current becomes larger. Such a result is clearly desirable, because one thereby increases the immunity of the device to atmospheric discharges and other parasites of small amplitude, whilst improving the protection to persons.

It will be noted that the rectifier circuit used in the circuit rectifies the two alternations which avoids a defect of prior art devices provided with a mono-alternation rectifier, that is to say the supplementary delay, as most equal to 10 ms, introduced in the throw-out when the fault occurs during the non-rectified alternation.

It will be obvious that modifications of detail could be made in the circuit described and shown, without exceeding the scope of the invention.

We claim:

1. In a protection device comprising first and second differential transformers each having a toroidal magnetic core through which pass the neutral and phase conductors of an alternating current distribution circuit, and a secondary winding, the secondary winding of the first transformer being coupled to the input of a first amplifier followed by a rectifier, a threshold comparator and a control means suitable for actuating a circuit breaker, the secondary winding of the second transformer being coupled to the output of the said first amplifier, the improvement comprising an auxiliary amplifier having an input and an output, the input of the said auxiliary amplifier being coupled to the output of the first amplifier and the output of said auxiliary amplifier being coupled to the secondary winding of the second differential transformer.

2. A protection device, according to claim 1, wherein a first adjustment of gain of the first amplifier determines the sensitivity of the device to differential currents, whilst the auxiliary differential amplifier is provided with a second separate adjustment of gain permitting the adjustment of the conditions of oscillation.

3. A protection device, according to claim 2, wherein the gain of the first amplifier decreases when its input voltage increases.

4. A protection device, according to claim 2, wherein the said auxiliary amplifier is arranged to be insensitive to the frequency of the distribution circuit by means of a selective filter.

5. A protection device, according to claim 4, wherein the gain of the first amplifier decreases when its input voltage increases.

6. A protection device, according to claim 1, wherein the rectifier is arranged to shape both alternations of the alternating current.

7. A protection device, according to claim 1, comprising a resistance capacity circuit inserted between the shaper and the threshold comparator.

8. A protection device, according to claim 1 wherein the said auxiliary amplifier is arranged to be insensitive to the frequency of the distribution circuit by means of a selective filter.

9. A protection device, according to claim 1 wherein the gain of the first amplifier decreases when its input voltage increases.

* * * * *